Nov. 18, 1941.　　　　G. HEIM　　　　2,263,038
WELDING APPLIANCE
Filed March 14, 1938　　　　2 Sheets-Sheet 1

INVENTOR
GERHARD HEIM
BY
ATTORNEYS

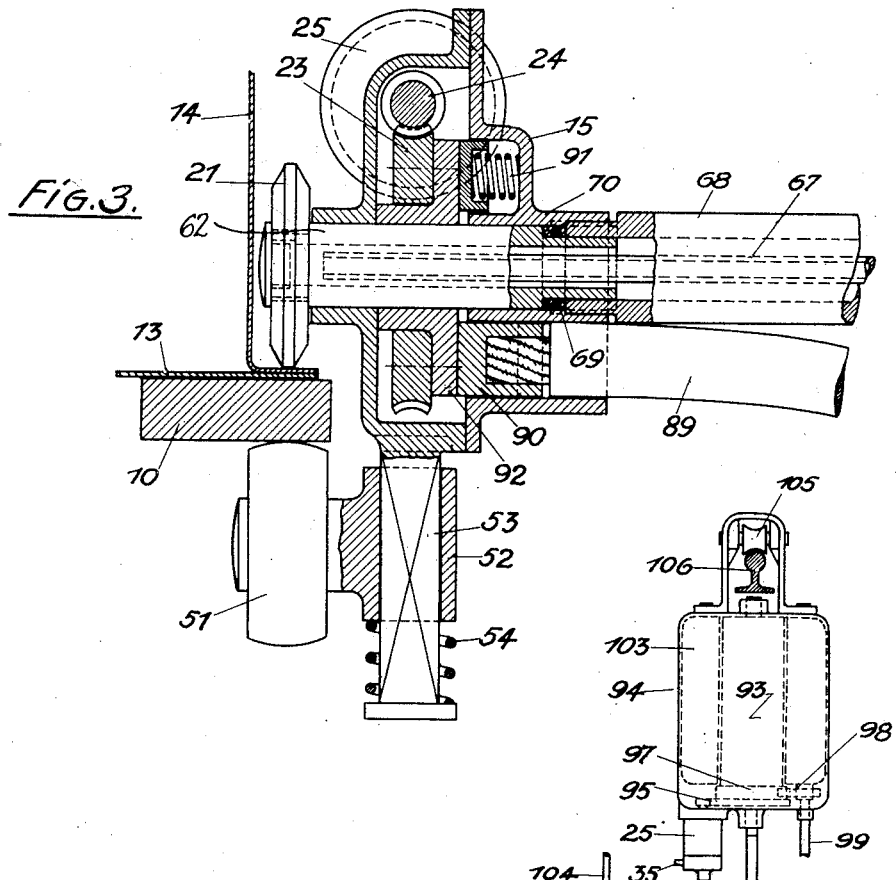
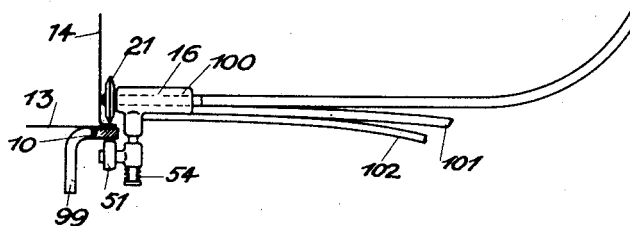

Patented Nov. 18, 1941

2,263,038

UNITED STATES PATENT OFFICE 2,263,038

WELDING APPLIANCE

Gerhard Heim, Sindelfingen, near Stuttgart, Germany, assignor to Daimler-Benz Aktiengesellschaft, Stuttgart-Unterturkheim, Germany Application March 14, 1938, Serial No. 195,804
In Germany March 15, 1937

27 Claims. (Cl. 219—4)

This invention relates to an improved welding appliance and is concerned with a hand appliance comprising an electrode roller adapted for the spot welding of, for example, sheet metal objects on a work-supporting electrode.

An important object is to provide an appliance adapted for producing a series of welding points in quick succession and with uniform spacing. With such an appliance, the operator is saved the tiresome labour of moving the appliance from spot to spot and performing pressing and releasing operations at each. Thus, the production of all-steel bodies for motor vehicles, for example, is cheapened and simplified.

A further object is to provide an appliance with laterally disposed electrode roller and bearing roller spaced from one another at the correct distance for enabling them to grip between themselves the work-supporting electrode and the work thereon.

Yet another object is to adapt the machine for use with a single electrode work support, or with a double electrode work support comprising electrode elements either superposed, or side by side, or in angular relation with one another.

Still another object is to provide a roller drive, an intermittent switch drive, a travelling transformer drive, self-gripping bearing roller arrangements, and water cooling arrangements all with the object of increasing the handiness and efficiency of the appliance.

These and other objects and features of the invention will appear from the detailed description of certain examples to be described with reference to the annexed drawings, wherein:

Fig. 3 is a vertical cross-sectional view of still a third form of welding appliance; and Fig. 4 is a side view, partially in cross-section, upon a smaller scale, of an improved type of welding appliance in combination with a travelling transformer and motor.

Figure 1:
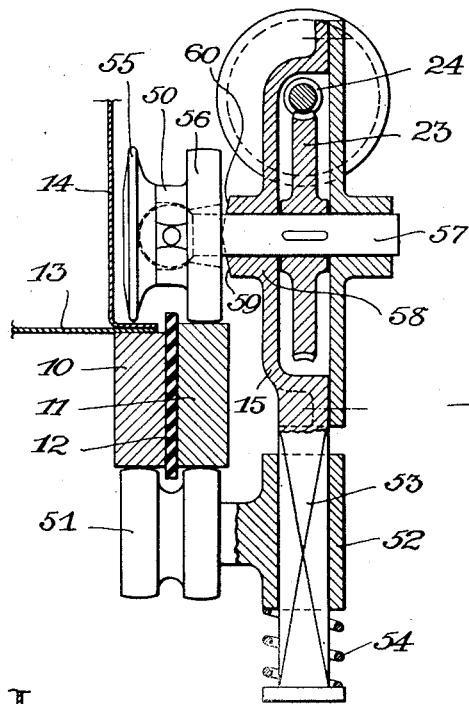
Fig. 1 is a vertical cross-sectional view illustrating one form of welding appliance and its relationship with the work to be welded.

In Figure 1 the two conducting bars 10 and 11 are disposed side by side with an intermediate insulating layer 12. In this instance also, only the welding roller 50 is positively driven through the worm gearing 23, 24, the bearing roller 51 being a trailing roller only. The bearing roller, which in this case does not serve for the current conduction and is therefore made of insulating material, is carried by a sleeve-shaped slider 52. The latter slides upon a square pin 53 fixedly connected to the housing 15 of the appliance and is pressed constantly upwards by a helical spring 54. The force of the spring is so proportioned that it constantly presses the bearing roller 51 up and forces the welding roller 50 down by way of the housing 15, with the necessary pressure against the conducting bars 10, 11 for the welding of the two objects 13, 14 when these are interposed. The welding roller comprises a replaceable part 55 and a part 56 releasably connected thereto. It is connected by a Cardan-joint with its shaft 57 so that it compensates automatically for any differences of level between the upper edge of the conducting bar 11 and the point of contact with the object 14. This compensation is necessary because, in this case, the welding roller alone takes care of the current conduction from the bar 11 to the object. By this means, at the same time, a more satisfactory contact of the welding roller with the object is also maintained if the diameter of the part 55 has become reduced due to wear and grinding. The hub 58 of the housing 15 serving as a bearing for the shaft 57 of the welding roller is bevelled at 59 and 60, commencing from a horizontal centre line, so that the welding roller, although it can swing about a horizontal axis due to its Cardan suspension, nevertheless must always set itself, in relation to its vertical swinging axis, in the direction in which the appliance is advanced.

The construction last described has the advantage of a particularly short current path and of an always uniform pressure of the welding roller on the object irrespective of the care of the operator.

Figure 2:
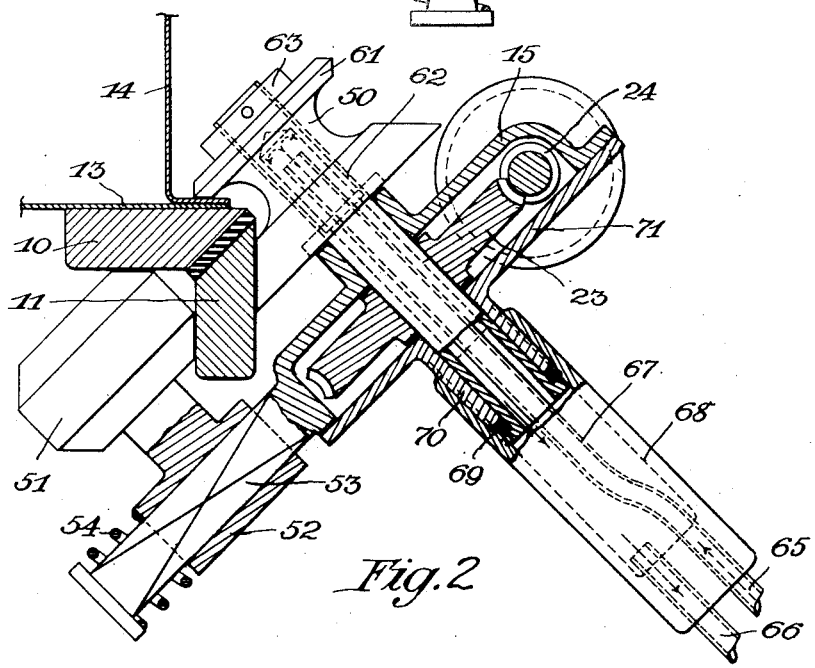
Fig. 2 is a vertical cross-sectional view of a modified form of welding appliance according to this invention.

Figure 2, illustrates a construction somewhat similar to the preceding construction. In contrast to the previous examples, however, the two conducting bars 10 and 11 are arranged at right angles to each other, which necessitates the special profiling of the bearing roller 51 and welding roller 50 as shown. In this case the Cardan suspension of the welding roller is dispensed with, since the spring 54 constantly forces the rollers towards the bars in a plane bisecting the angle between the two bars. Wear of the edge 61 of the welding roller can be compensated for by screwing up the welding roller (which is secured by means of a thread upon its hollow shaft 62) more or less on the shaft 62 and securing it against unintentional turning by a lock nut 63.

Figure 2 also shows a modified water cooling means. The supply and discharge of the water are effected by rubber hoses connected to pipe spigots 65 and 66. A fixedly mounted supply pipe 67 extends through the hollow handle 68 through the hollow shaft 62 to the outer end thereof where the water issues into the hollow shaft in order to flow out again from the appliance through the spigot 66 after passing through the hollow shaft. A packing 69 prevents the passage of the cooling water between the shaft 62 and its bearing 70 in the housing cover 71.

In Figure 3, the work-supporting electrode comprises only a single conducting bar 10 upon which the objects 13, 14 to be welded are clamped. The welding roller 21 releasably secured upon the hollow shaft 62 is, in this case also, positively driven from the motor 25 through the worm gearing 23, 24. The undriven bearing roller 51 which is constantly pressed firmly against the underside of the bar 10 by a spring 54 carries no welding current in this case, and is made of insulating material. It merely maintains the necessary pressure of the welding roller 21 upon the work. The bar 10 is connected to one terminal of the secondary side of the welding transformer, whilst a strong flexible cable 89 leads from the other terminal of the transformer to a slip ring 90 which is axially displaceable in the housing 15 and is influenced by helical spring 91 to bear lightly against a contact disc 92 rotating with the hollow shaft 62. Therefore, the welding current passes from the transformer through the cable 89, the slip ring 90, the contact disc 92, the hollow shaft 62 and the welding roller 21, and through the work 13, 14 to the conducting bar 10 to return thence to the transformer. The water cooling means may be similar to those previously described.

Figure 4, illustrates a particularly light and simple hand appliance and this is achieved primarily because in this case the welding transformer, or at least its secondary winding, is rotatably suspended. The transformer secondary 93 which is rotatably mounted in the transformer housing 94, is driven by the motor 25, connected by flanges to the housing, through a gearing 95. The shaft of the rotatable transformer-part 93 is extended by a flexible cable 96 which is connected to the one terminal of the secondary winding of the transformer and serves at the same time as a flexible shaft in that it transmits the rotary motion of the transformer-part 93 positively to the shaft 16 of the welding roller 21. The other terminal of the rotatable secondary is connected to a slip ring 97 from which the welding current is taken by a sliding contact 98 in order to be supplied by way of the cable 99 to the work-supporting electrode bar 10. The shaft 16 of the welding roller is rotatably mounted in the double-walled housing 100. The hollow space between the housing walls is traversed by cooling water which is supplied and discharged through rubber hoses 101, 102. The bearing roller 51, made of insulating material in this case, merely enables the helical spring 54 to produce a uniform pressure on the welding roller 21. The primary winding 103 of the transformer, fixedly disposed in the housing 94, receives the supply current through the same flexible lead 104 as that which supplies current to the motor 25. In order that the transformer may freely follow the hand welding appliance when travelling along the work, it is suspended displaceably upon a rail 106 by means of one or more rollers 105.

I claim:

1. Welding apparatus comprising, in combination, a work-supporting conductor, a movable device having a pair of spaced apart rollers, one of said rollers being positioned in contact with said conductor, and the other in contact with the work to be welded, whereby said rollers are adapted to grip the conductor and work piece between them, and means for supplying welding current to the work supporting conductor and the roller in contact with said work piece.

2. Welding appliance comprising laterally disposed electrode and bearing rollers spaced apart for gripping between them the work and a work-supporting electrode, a motor in driving connection with said electrode roller, and a revoluble welding current switch driven by said motor.

3. Welding appliance comprising laterally disposed electrode and bearing rollers spaced apart for gripping between them the work and a work-supporting electrode, an electric motor, worm gearing between said motor and said electrode roller, a revoluble welding current switch, and a reduction gearing between said motor and said revoluble switch.

4. A portable welding appliance comprising, in combination, a laterally extending roller formed of current conducting material, a second laterally extending roller of insulating material spaced apart from said first roller, and a motor drivably connected to said current conducting roller.

5. Welding apparatus comprising, in combination, a work-supporting conductor, a movable device having a pair of spaced apart rollers, one of said rollers being formed of conducting material and the other of insulating material, said insulating roller being positioned in contact with said conductor, and the conducting roller in contact with the work to be welded, whereby said rollers are adapted to grip said conductor and work piece between them, and means for supplying welding current to said work-supporting conductor and said conducting roller.

6. Welding appliance comprising an electrode roller, a driving shaft therefor, a Cardan joint between said roller and shaft, a motor in driving connection with said shaft, stop means operative for preventing deflection of said electrode roller from its proper line of travel, and a bearing roller spaced from said electrode roller so that said rollers may grip between them the work and a work-supporting bar electrode.

7. Welding apparatus comprising, in combination, a pair of side-by-side conductors having insulation therebetween, one of said conductors serving as a work-supporting medium, a movable device having a pair of spaced apart rollers, one of said rollers being positioned in contact with the work-supporting conductor and the other in contact with the work to be welded, means for supplying welding current to said conductors, and means for conducting current to the work-contacting roller from the non-work-supporting conductor.

8. Welding apparatus comprising, in combination, a pair of angularly disposed conductor rails having insulation therebetween, one of said rails serving as a work-supporting medium, a movable device having a pair of spaced apart rollers, one of said rollers being positioned in contact with the work-supporting rail and the other in contact with the work to be welded, means for supplying welding current to said rails and means for conducting current to the work-contacting roller from the non-work-supporting rail.

9. The combination according to claim 8, in combination with means for adjusting said work-contacting roller to compensate for wear thereof.

10. A welding apparatus comprising, in combination, a pair of side-by-side conductors having insulation therebetween, one of said conductors being adapted to serve as a work-supporting member, a movable device having a conducting roller with two conducting surfaces, one surface adapted to contact one conductor and the other surface to contact the work to be welded, and means for supplying welding current to said conductors.

11. The combination according to claim 10, in which said movable device is formed with a second roller of insulating material spaced apart from said first roller and adapted to contact the opposite sides of said conductors.

12. Welding apparatus comprising, in combination, a pair of angularly disposed conductors having insulation therebetween, one of said conductors being adapted to serve as a work-supporting member, a movable device having a conducting roller with two obliquely directed faces, one face adapted to contact one conductor and the other face to contact the work to be welded, and means for supplying welding current to said conductors.

13. The combination according to claim 12, in combination with a further roller on said movable device having running surfaces extending at an oblique angle to one another, said further roller being pressed against the said conductors on the side opposite to that of the conducting roller so that the conductors together with the work piece are between the conducting roller and said further roller, spring means for pressing the conducting roller and the supporting roller toward one another, and means for axially adjusting the conducting roller.

14. Welding apparatus comprising a composite work supporting electrode consisting of juxtaposed conductor bars with interposed insulation, and a welding appliance comprising a laterally disposed electrode roller adapted for running upon twin track surfaces presented by one side of said bars and for conducting current from one to the other through work supported thereon, a motor in driving connection with said electrode roller, and a non-conductive bearing roller adapted for running along the opposite side of said bars.

15. Welding apparatus comprising a composite work-supporting electrode consisting of juxtaposed conductor bars with interposed insulation, and a welding appliance comprising a laterally disposed electrode roller adapted for running upon twin track surfaces presented by one side of said bars and for conducting current from one to the other through work supported thereon, a motor in driving connection with said electrode roller, and a non-conductive bearing roller adapted for running along the opposite side of said bars, the contacting surfaces of said electrode roller and said twin track surfaces being so formed relatively to one another as to prevent lateral slipping of said electrode roller relatively to said track surfaces.

16. Welding apparatus comprising a composite work-supporting electrode consisting of juxtaposed conductor bars with interposed insulation, and a welding appliance comprising a shaft, a laterally disposed two-part electrode roller adapted for running upon twin track surfaces presented by one side of said bars and for conducting current from one to the other through work supported thereon, means for pivotally mounting said electrode roller upon said shaft about an axis transverse to said shaft and substantially parallel to said track surfaces, a motor in driving connection with said shaft, and a non-conductive bearing roller adapted for running along the opposite side of said bars.

17. Welding apparatus adapted for producing a series of spot welds and for operating along a conductor bar serving as a work-supporting electrode, said apparatus comprising a hand tool mounting laterally disposed electrode and bearing rollers, a transformer having suspension means and a revoluble element, a motor mounted on said transformer and in driving connection with the revoluble element thereof, and a mechanical and electrical power transmission cable connected between said revoluble elemnt and said electrode roller.

18. Welding apparatus adapted for producing a series of spot welds and for operating along a conductor bar serving as a work-supporting electrode, said apparatus comprising a hand tool mounting laterally disposed electrode and bearing rollers, a travelling and swingably suspended transformer comprising a revoluble secondary, a motor mounted on said transformer and in driving connection with said revoluble secondary, and a mechanical and electrical power transmission cable connected between said revoluble secondary and said electrode roller.

19. The combination according to claim 12, in combination with a further roller on said movable device, having running surfaces extending at an oblique angle to one another, said further roller being pressed against the said conductors on the side opposite to that of the conducting roller, so that the conductors together with the workpiece are between the conducting roller and said further roller, and spring means for pressing the conducting roller and the supporting roller toward one another.

20. Welding apparatus comprising, in combination, a pair of rails positioned at an angle to one another, one of which is adapted to support a workpiece to be welded, a movable device having a shaft, two conducting roller parts mounted upon said shaft, having conical running surfaces inclined toward one another in such a manner that the one conducting roller part runs upon one rail and the other upon the workpiece to be welded, an abutting roller on said movable device having running surfaces positioned at an angle to one another, and mounted in such a manner that said abutting roller abuts against the said rails on the opposite side from the conducting roller, so that the rails together with the workpiece are situated between the conducting roller and the abutting roller, spring means through which the conducting roller and the abutting roller are pressed in a direction toward one another, and means for conducting welding current through the workpiece and the running roller part in contact with it.

21. The combination according to claim 20, in combination with means for axially adjusting the conducting roller parts relatively to the abutting roller.

22. Welding apparatus comprising, in combination, a work-supporting conductor, a movable device having a pair of spaced apart rollers, one of said rollers being formed of conducting material and the other having its outer contacting surface insulated from the welding circuit and positioned in contact with said conductor, and the conducting roller in contact with the work to be welded, whereby said rollers are adapted to grip said conductor and workpiece between them, and means for supplying welding current to said work-supporting conductor and said conducting roller.

23. The combination according to claim 22, in combination with a motor drivably connected to one of said rollers.

24. The combination according to claim 22, in combination with a motor drivably connected to the current-conducting roller, while the other roller is formed as an undriven running roller.

25. Welding apparatus comprising, in combination, a conductor adapted to serve as a support for the workpiece to be welded, a movable device having a pair of rollers positioned at a distance from one another and enclosing the work piece and conductor between them, of which one roller is in contact with the workpiece to be welded, a welding current circuit including means for leading the current to the roller contacting the workpiece and thence from the latter, and a motor drivably connected to one of said rollers, while the other roller is formed as an undriven running roller.

26. The combination according to claim 25, in combination with a switch in the motor circuit, and means for intermittently opening and closing said switch during the travel of the driven roller.

27. Welding apparatus comprising, in combination, a track adapted to support the work to be welded along its length, a movable device including a housing having a pair of spaced apart rollers extending laterally from said housing, one of said rollers being positioned in contact with said track and the other in contact with the work to be welded, whereby said rollers are adapted to grip the track and workpiece between them in such a manner that the rollers can roll freely upon the track and the workpiece in the longitudinal direction of the same, and the housing of the movable device moves along the side of the track together with the rollers, and means for supplying welding current to the work-supporting track and the roller in contact with the workpiece.

GERHARD HEIM.